(12) United States Patent
Furuya et al.

(10) Patent No.: US 11,054,793 B2
(45) Date of Patent: Jul. 6, 2021

(54) LEARNING PROCESSOR, LEARNING PROCESSING METHOD, PRODUCTION METHOD OF COMPOUND SEMICONDUCTOR, AND RECORDING MEDIUM

(71) Applicant: Asahi Kasei Microdevices Corporation, Tokyo (JP)

(72) Inventors: Takaaki Furuya, Tokyo (JP); Koichiro Ueno, Tokyo (JP)

(73) Assignee: Asahi Kasei Microdevices Corporation, Tokyo (JP)

(*) Notice: Subject to any disclaimer, the term of this patent is extended or adjusted under 35 U.S.C. 154(b) by 0 days.

(21) Appl. No.: 16/520,390

(22) Filed: Jul. 24, 2019

(65) Prior Publication Data

US 2020/0033820 A1 Jan. 30, 2020

(30) Foreign Application Priority Data

Jul. 25, 2018 (JP) .............................. JP2018-139848

(51) Int. Cl.
*G05B 13/02* (2006.01)
*G06N 5/04* (2006.01)
*G06N 20/00* (2019.01)

(52) U.S. Cl.
CPC ........... *G05B 13/0265* (2013.01); *G06N 5/04* (2013.01); *G06N 20/00* (2019.01)

(58) Field of Classification Search
CPC ....... G05B 13/0265; G06N 20/00; G06N 5/04
See application file for complete search history.

(56) References Cited

U.S. PATENT DOCUMENTS

| 5,985,025 A | 11/1999 | Celii |
| 6,511,898 B1 | 1/2003 | Sonderman |
| 2017/0278714 A1 | 9/2017 | Takenaga |
| 2018/0226304 A1* | 8/2018 | Chen .................. G01B 9/02007 |
| 2019/0036017 A1* | 1/2019 | Saghayezhian .......... H01L 43/02 |
| 2019/0139857 A1* | 5/2019 | Twitchen ............... C23C 16/278 |
| 2019/0340316 A1* | 11/2019 | Lili ......................... G06F 30/20 |
| 2019/0360923 A1* | 11/2019 | Atanasoff .......... G01N 21/3103 |

FOREIGN PATENT DOCUMENTS

| JP | H03171301 A | 7/1991 |
| JP | H0637021 A | 2/1994 |
| JP | H10237645 A | 9/1998 |
| JP | H10245674 A | 9/1998 |
| JP | 2013056803 A | 3/2013 |

* cited by examiner

*Primary Examiner* — Chad G Erdman

(57) ABSTRACT

Provided is a learning processor including a base characteristic acquiring section that acquires base characteristic data indicating a characteristic of a base layer serving as a base on which a film is to be deposited by a film deposition apparatus; a film characteristic acquiring section that acquires film characteristic data indicating a characteristic of the film deposited on the base layer by the film deposition apparatus; and a first learning processing section that performs learning processing of a first model that outputs predicted film characteristic data obtained by predicting a characteristic of a film to be deposited by the film deposition apparatus based on targeted base characteristic data indicating a characteristic of a base layer serving as a target for formation of the film, using learning data that includes the base characteristic data and the film characteristic data.

17 Claims, 8 Drawing Sheets

LEARNING PROCESSOR, LEARNING PROCESSING METHOD, PRODUCTION METHOD OF COMPOUND SEMICONDUCTOR, AND RECORDING MEDIUM

The contents of the following Japanese patent application(s) are incorporated herein by reference:
2018-139848 filed in JP on Jul. 25, 2018

BACKGROUND

1. Technical Field

The present invention relates to a learning processor, a learning processing method, a compound semiconductor production method, and a recording medium.

2. Related Art

Conventionally, in order to obtain a film with desired characteristics using a film deposition apparatus such as a molecular beam epitaxy apparatus, it is necessary for a skilled operator to perform trial and error, as shown in Patent Document 1, for example. Patent Document 1: Japanese Patent Application Publication No. 2013-56803

In recent years, there has been a demand to be able to efficiently acquire the characteristics of a film to be deposited

SUMMARY

In order to solve the above problem, according to a first aspect of the present invention, provided is a learning processor. The learning processor may comprise a base characteristic acquiring section that acquires base characteristic data indicating a characteristic of a base layer serving as a base on which a film is to be deposited by a film deposition apparatus. The learning processor may comprise a film characteristic acquiring section that acquires film characteristic data indicating a characteristic of the film deposited on the base layer by the film deposition apparatus. The learning processor may comprise a first learning processing section that performs learning processing of a first model that outputs predicted film characteristic data obtained by predicting a characteristic of a film to be deposited by the film deposition apparatus based on targeted base characteristic data indicating a characteristic of a base layer serving as a target for formation of the film, using learning data that includes the base characteristic data and the film characteristic data.

According to a second aspect of the present invention, provided is a learning processing method. The learning processing method may comprise acquiring base characteristic data indicating a characteristic of a base layer serving as a base on which a film is to be deposited by a film deposition apparatus. The learning processing method may comprise acquiring film characteristic data indicating a characteristic of the film deposited on the base layer by the film deposition apparatus. The learning processing method may comprise performing learning processing of a first model that outputs predicted film characteristic data obtained by predicting a characteristic of a film to be deposited by the film deposition apparatus based on targeted base characteristic data indicating a characteristic of a base layer serving as a target for formation of the film, using learning data that includes the base characteristic data and the film characteristic data.

The learning processing method may further comprise acquiring film deposition condition data indicating a film deposition condition when the film was deposited by the film deposition apparatus on the base layer, the film deposition condition data including at least one of control condition data indicating a control condition used to control the film deposition apparatus when the film was deposited on the base layer and state data indicating a state of the film deposition apparatus. The learning processing method may further comprise performing learning processing of a second model that outputs recommended control condition data indicating the control condition recommended for depositing a film having a target characteristic based on the targeted base characteristic data and target film characteristic data indicating a target characteristic of the film, using learning data that includes the base characteristic data, the film characteristic data, and the film deposition condition data. The performing learning processing of the first model may include performing learning processing of the first model that outputs the predicted film characteristic data based on the targeted base characteristic data and the film deposition condition data, using the learning data that further includes the film deposition condition data.

According to a third aspect of the present invention, provided is a compound semiconductor production method. The compound semiconductor production method may comprise preparing a substrate. The compound semiconductor production method may comprise stacking a plurality of films to be included in a compound semiconductor on the substrate. The stacking may include causing a film deposition apparatus to operate using recommended control condition data obtained through the learning processing method according to the second aspect, to deposit at least one film among the plurality of films.

According to a fourth aspect of the present invention, provided is a recording medium storing thereon a program. The program may cause a computer to function as a base characteristic acquiring section that acquires base characteristic data indicating a characteristic of a base layer serving as a base on which a film is to be deposited by a film deposition apparatus. The program may cause a computer to function as a film characteristic acquiring section that acquires film characteristic data indicating a characteristic of the film deposited on the base layer by the film deposition apparatus. The program may cause a computer to function as a first learning processing section that performs learning processing of a first model that outputs predicted film characteristic data obtained by predicting a characteristic of a film to be deposited by the film deposition apparatus based on targeted base characteristic data indicating a characteristic of a base layer serving as a target for formation of the film, using learning data that includes the base characteristic data and the film characteristic data.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
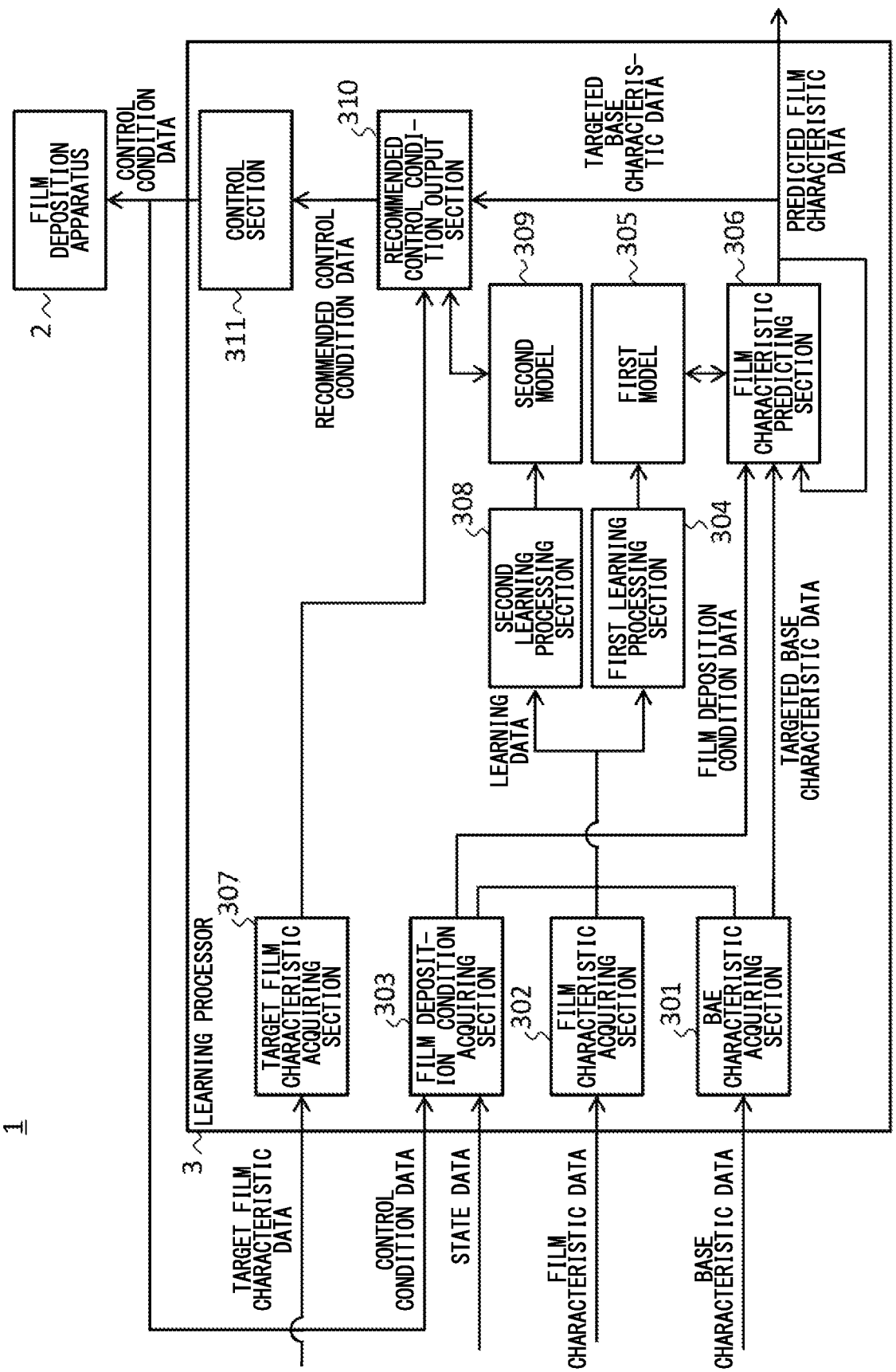
FIG. 1 shows a system 1 according to the present embodiment.

FIG. 1 shows a system 1 according to the present embodiment. The system 1 includes a film deposition apparatus 2 and a learning processor 3.

(1-1. Film Deposition Apparatus)

The film deposition apparatus 2 deposits a film on a surface of a substrate. The film deposition apparatus 2 may perform film deposition using vapor deposition, or another technique.

(1-2. Learning Processor)

The learning processor 3 performs learning processing using machine learning, and includes a base characteristic acquiring section 301, a film characteristic acquiring section 302, a film deposition condition acquiring section 303, a first learning processing section 304, a first model 305, and a film characteristic predicting section 306. As an example in the present embodiment, the learning processor 3 is able to control the film deposition apparatus 2, and also includes a target film characteristic acquiring section 307, a second learning processing section 308, a second model 309, a recommended control condition output section 310, and a control section 311.

(1-2-1. Base Characteristic Acquiring Section)

The base characteristic acquiring section 301 acquires base characteristic data indicating characteristics of a base layer that serves as a base on which the film is to be deposited by the film deposition apparatus 2. If the film deposition apparatus 2 is to perform film deposition by stacking a plurality of films, the film of each layer below the film on the top surface may be a base layer relative to the film that is one layer above. If the film deposition apparatus 2 is to perform film deposition on the surface of a substrate, the substrate itself may be the base layer. The base characteristic acquiring section 301 may acquire the base characteristic data from at least one of an operator and a measurement apparatus (not shown in the drawings) for measuring the characteristics. The base characteristic acquiring section 301 may supply the acquired base characteristic data to the first learning processing section 304, the second learning processing section 308, and the film characteristic predicting section 306.

(1-2-2. Film Characteristic Acquiring Section)

The film characteristic acquiring section 302 acquires the film characteristic data indicating the characteristics of the film deposited on the base layer by the film deposition apparatus 2. The film characteristic acquiring section 302 may acquire the film characteristic data from at least one of the operator and the measurement apparatus (not shown in the drawings) for measuring the film characteristics. The measurement apparatus may be arranged within the film deposition apparatus 2 or outside of the film deposition apparatus 2. The film characteristic acquiring section 302 may supply the acquired film characteristic data to the first learning processing section 304 and the second learning processing section 308.

(1-2-3. Film Deposition Condition Acquiring Section)

The film deposition condition acquiring section 303 acquires film deposition condition data indicating film deposition conditions used to deposit the film on the base layer using the film deposition apparatus 2. The film deposition condition data may include at least one of control condition data indicating the control conditions for controlling the film deposition apparatus 2 when depositing the film on the base layer and state data indicating a state of the film deposition apparatus 2. The film deposition condition acquiring section 303 may acquire the film deposition condition data from at least one of the operator, the film deposition apparatus 2, and the control section 311 described further below. The film deposition condition acquiring section 303 may supply the acquired film deposition condition data to the first learning processing section 304, the second learning processing section 308, and the film characteristic predicting section 306.

(1-2-4. First Learning Processing Section)

The first learning processing section 304 performs learning processing of the first model 305 using learning data input thereto. The learning data used by the first learning processing section 304 may include the base characteristic data from the base characteristic acquiring section 301, the film characteristic data from the film characteristic acquiring section 302, and the film deposition condition data from the film deposition condition acquiring section 303. If a plurality of films are to be stacked, the first learning processing section 304 may perform the learning processing using the learning data that includes the base characteristic data of the base layer of each film, the film characteristic data of each film, and the film deposition condition data of each film. The first learning processing section 304 may perform the learning processing using learning data that includes the film characteristic data and base characteristic data for the films and base layers included in the actual product and the film deposition condition data of these films. Furthermore, instead of using the learning data including the film characteristic data and base characteristic data of the films included in the actual product, the first learning processing section 304 may perform the learning processing using the learning data that includes the film characteristic data and base characteristic data for films and base layers having different materials from and the same crystal configurations as the films and base layers included in the actual product. In this way, learning data in a case where a laminated film including InSb/GaAs and InP/GaAs, InAs/AlAs, and the like may be used in the learning processing for depositing a laminated film of InAs/GaAs, for example.

(1-2-5. First Model)

The first model 305 outputs predicted film characteristic data obtained by predicting the characteristics of the film to be deposited by the film deposition apparatus 2 based on the film deposition condition data and the base characteristic data indicating the characteristics of the base layer that is a target for the film formation (also referred to as the targeted base characteristic data). As an example in the present embodiment, the first model 305 acquires the targeted base characteristic data from the film characteristic predicting section 306 and outputs the predicted film characteristic data to the film characteristic predicting section 306.

(1-2-6. Film Characteristic Predicting Section)

The film characteristic predicting section 306 outputs the predicted film characteristic data obtained by using the first model 305 to predict the characteristics of the film to be deposited. For example, the film characteristic predicting section 306 outputs first predicted film characteristic data obtained by predicting the characteristics of a first film to be deposited on a first base layer based on first base characteristic data indicating the characteristics of the first base layer. The film characteristic predicting section 306 further outputs second predicted film characteristic data obtained by predicting the characteristics of a second film to be deposited on the first film based on the first predicted film characteristic data. As an example in the present embodiment, the film characteristic predicting section 306 may use the first model 305 to output the first predicted film characteristic data based on the first base characteristic data and the film deposition condition data indicating the film deposition conditions when the first film was deposited, and to further output the second predicted film characteristic data based on the first predicted film characteristic data and the film deposition condition data indicating the film deposition conditions when the second film was deposited. After this, in a similar manner, the film characteristic predicting section 306 may output the predicted film characteristic data of each film to be stacked, using the predicted film characteristic data of the film to be deposited as the base characteristic data. The film characteristic predicting section 306 may output the predicted film characteristic data to the outside of the learning processor 3.

(1-2-7. Target Film Characteristic Acquiring Section)

The target film characteristic acquiring section 307 acquires target film characteristic data that indicates target characteristics of a film. As an example in the present embodiment, the target film characteristic acquiring section 307 acquires the target film characteristic data from the operator. The target film characteristic acquiring section 307 may supply the acquired target film characteristic data to the recommended control condition output section 310.

(1-2-8. Second Learning Processing Section)

The second learning processing section 308 performs learning processing of the second model 309 using the learning data input thereto. The learning data used by the second learning processing section 308 may include the base characteristic data, the film characteristic data, and the film deposition condition data. If a plurality of films are to be stacked, the second learning processing section 308 may perform the learning processing using the learning data that includes the film characteristic data of each film, the film deposition condition data of each film, and the base characteristic data of the base layer of each film. At least one of the base characteristic data and the film characteristic data may be the predicted film characteristic data output from the film characteristic predicting section 306 using the first model 305. In the same manner as the first learning processing section 304, the second learning processing section 308 may perform the learning processing using learning data that includes the film characteristic data and base characteristic data for the films and base layers included in the actual product and the film deposition condition data of these films or, instead of using the learning data including the film characteristic data and base characteristic data of the films included in the actual product, the second learning processing section 308 may perform the learning processing using the learning data that includes the film characteristic data and base characteristic data for films and base layers having different materials from and the same crystal configurations as the films and base layers included in the actual product.

(1-2-9. Second Model)

The second model 309 outputs recommended control condition data indicating control conditions recommended for depositing the film with the target characteristics, based on the targeted base characteristic data indicating the characteristics of the base layer that is the target of the film formation and the target film characteristic data indicating the target characteristics of the film. As an example in the present embodiment, the second model 309 acquires the target film characteristic data from the recommended control condition output section 310, and outputs the recommended control condition data to the recommended control condition output section 310.

(1-2-10. Recommended Control Condition Output Section)

The recommended control condition output section 310 outputs the recommended control condition data indicating the control conditions that are recommended for depositing the film with the target characteristics based on the targeted base characteristic data and the target film characteristic data, using the second model 309. As an example in the present embodiment, the recommended control condition output section 310 outputs first recommended control condition data for depositing the second film, based on the first predicted film characteristic data serving as the targeted base characteristic data predicted by the film characteristic predicting section 306 for the first film serving as the base layer and on the first target film characteristic data indicating the target characteristics for the second film to be deposited on the first film. Similarly, the recommended control condition output section 310 may output the recommended control condition data for depositing each film to be stacked, based on the predicted film characteristic data from the film characteristic predicting section 306 and the target film characteristic data from the target film characteristic acquiring section 307. The recommended control condition output section 310 may acquire the targeted base characteristic data from the base characteristic acquiring section 301. The recommended control condition output section 310 may supply the recommended control condition data to the control section 311.

(1-2-11. Control Section)

The control section 311 causes the film deposition apparatus 2 to operate in accordance with the control conditions indicated by the control condition data, by supplying this control condition data to the film deposition apparatus 2. The control section 311 may cause the film deposition apparatus 2 to operate according to the control conditions indicated by the recommended control condition data, by supplying this recommended control condition data to the film deposition apparatus 2. The control section 311 may also supply the film deposition condition acquiring section 303 with the control condition data supplied to the film deposition apparatus 2.

According to the system 1 described above, the learning processing of the first model 305 that outputs the predicted film characteristic data obtained by predicting the characteristics of the film to be deposited based on the targeted base characteristic data, and therefore it is possible to acquire the first model 305 that outputs the predicted film characteristic data in response to the input of the targeted base characteristic data. Accordingly, by using the first model 305, it is possible to efficiently acquire the predicted film characteristics. Furthermore, since the learning processing of the first model 305 is performed using the learning data that further includes the film deposition condition data in addition to the base characteristic data and the film characteristic data, it is possible to increase the learning accuracy of the first model 305.

Since the first predicted film characteristic data obtained by predicting the characteristics of the first film to be deposited based on the first base characteristic data of the first base layer is output by the first model 305, it is possible to acquire the predicted film characteristic data of the film to be deposited thereon, due to the input of the characteristic data of the base layer. Furthermore, since the second predicted film characteristic data obtained by predicting the characteristics of the second film to be deposited on the first film based on the first predicted film characteristic data is also output, it is possible to acquire the predicted film characteristic data of each film to be sequentially deposited.

Since the learning processing of the second model 309 that outputs the recommended control condition data based on the targeted base characteristic data and the target film characteristic data is performed, it is possible to acquire the second model 309 that outputs the recommended film characteristic data in response to the input of the targeted base characteristic data and the target film characteristic data.

Since the first predicted film characteristic data of the first film is output by the first model 305 based on the first base characteristic data and the recommended control condition data for depositing the second film is output by the second model 309 based on the first predicted film characteristic data and the target film characteristic data of the second film, it is possible to acquire the recommended control condition data of the second film based on the base characteristic data and the target film characteristic data of the second film. Furthermore, by using the target film characteristic data of the second film as the predicted film characteristic data of the second film, it is possible to output the recommended control condition data for depositing a third film, based on the predicted film characteristic data of the second film and the target film characteristic data of the third film. Similarly, it is possible to sequentially acquire the recommended control condition data for depositing each film.

(2. Film Deposition Apparatus)

Figure 2:
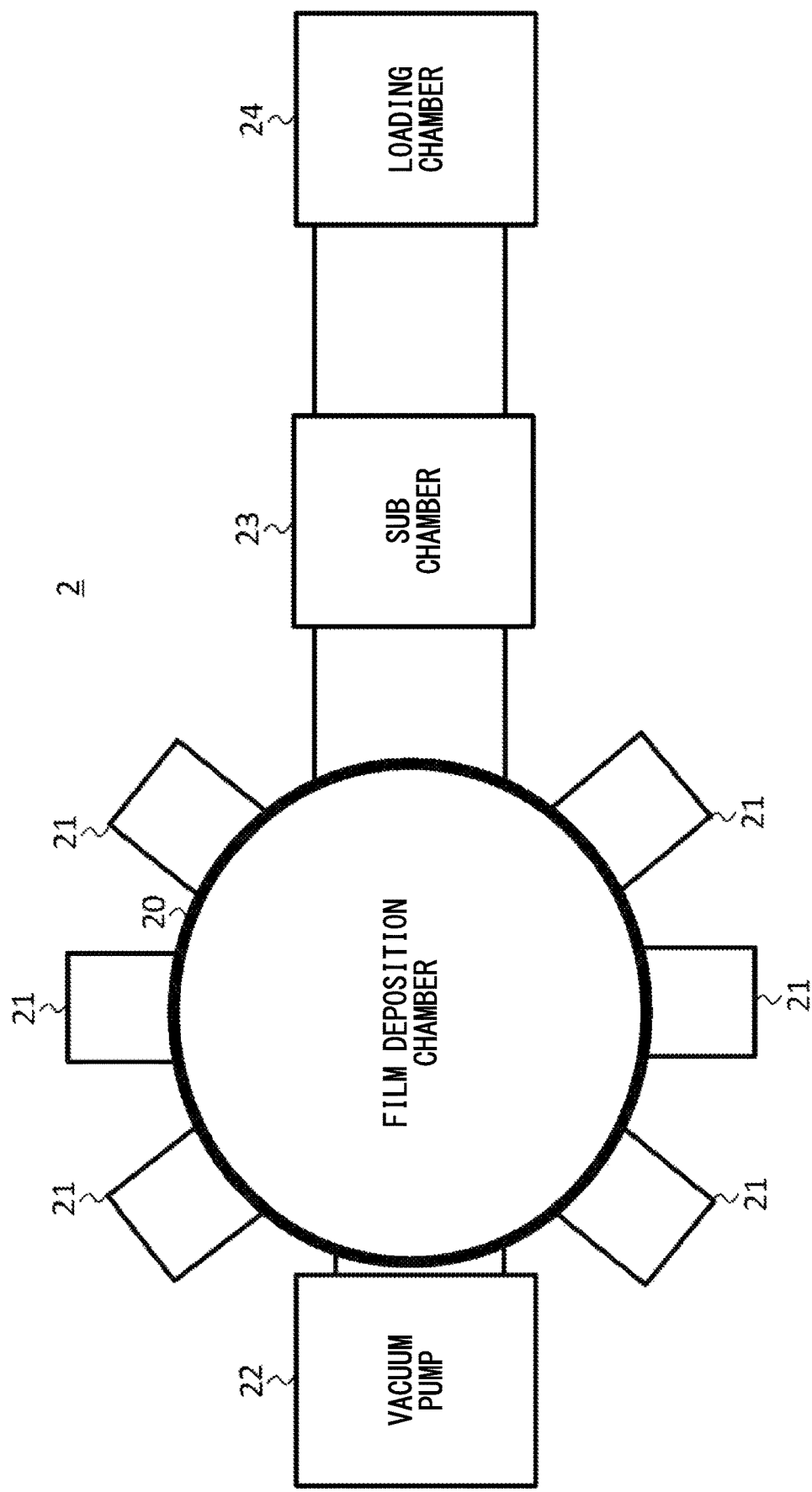
FIG. 2 is a planar view of the film deposition apparatus 2.

FIG. 2 is a planar view of the film deposition apparatus 2. As an example, the film deposition apparatus 2 is a molecular beam epitaxy apparatus, and deposits one or more films including at least one of Al, Ga, In, As, Sb, Si, Te, Sn, Zn, and Be onto a substrate 10 (see FIG. 3). As an example, the substrate may be a compound semiconductor made of gallium arsenide or the like, and the deposited film may be any of an n-type semiconductor layer, an undoped semiconductor layer, and a p-type active layer. Alternatively, the deposited film may be an unevenly doped layer (modulated doped layer) such as a δ doped layer, or may be a laminated body formed by these layers. The films deposited by the film deposition apparatus 2 and the base layers thereof may include a crystal structure belonging to any of a diamond type structure, a sphalerite type structure, and a wurtzite type structure. The diamond type structure may include silicon as the semiconductor, the sphalerite type structure may include gallium as the semiconductor, and the wurtzite type structure may include gallium nitride or aluminum nitride as the semiconductor. The lattice constants of the substrate 10 and the film deposited on the substrate 10 may differ, and the lattice constants of films that are adjacent above or below may each differ as well. The film deposition apparatus 2 includes a film deposition chamber 20, one or more cells 21, a vacuum pump 22, a sub chamber 23, and a loading chamber 24.

The film deposition chamber 20 is a sealed reaction chamber for depositing the film onto the substrate 10 held therein. The film deposition chamber 20 includes one or more ports (not shown in the drawings) for connecting to the cells 21, in a peripheral portion thereof. The number of ports is 12, for example. The cells 21 are connected to the ports of the film deposition chamber 20, and vaporize the raw material that is a solid to supply the gas to the surface of the substrate 10 as a molecular beam. The raw material in the cells 21 may be at least one of Al, Ga, In, As, Sb, Si, Te, Sn, Zn, and Be, and may be a single one of these materials or a compound of these materials. The vacuum pump 22 is connected to the film deposition chamber 20, and discharges the air that is inside the film deposition chamber 20. The vacuum pump 22 may reduce the pressure within the film deposition chamber 20 to a vacuum state of approximately $10^{-11}$ Torr ($\approx 10^{-9}$ Pa). The sub chamber 23 is connected to the film deposition chamber 20, and temporarily holds the substrate 10 before being supplied to the film deposition chamber 20 for deposition or the substrate 10 discharged from the film deposition chamber 20 after the deposition. The inside of the sub chamber 23 may be maintained in a vacuum state similar to that of the film deposition chamber 20. Furthermore, the sub chamber 23 may include a heating mechanism to heat the substrate 10 introduced from the loading chamber 24, described further below, to desorb the adsorbed water and adsorbed gas on the surface of the substrate 10. The loading chamber 24 is connected to the sub chamber 23, and temporarily holds the substrate 10 supplied from outside the film deposition apparatus 2 or the substrate 10 discharged from the sub chamber 23.

(2-1. Film Deposition Chamber)

Figure 3:
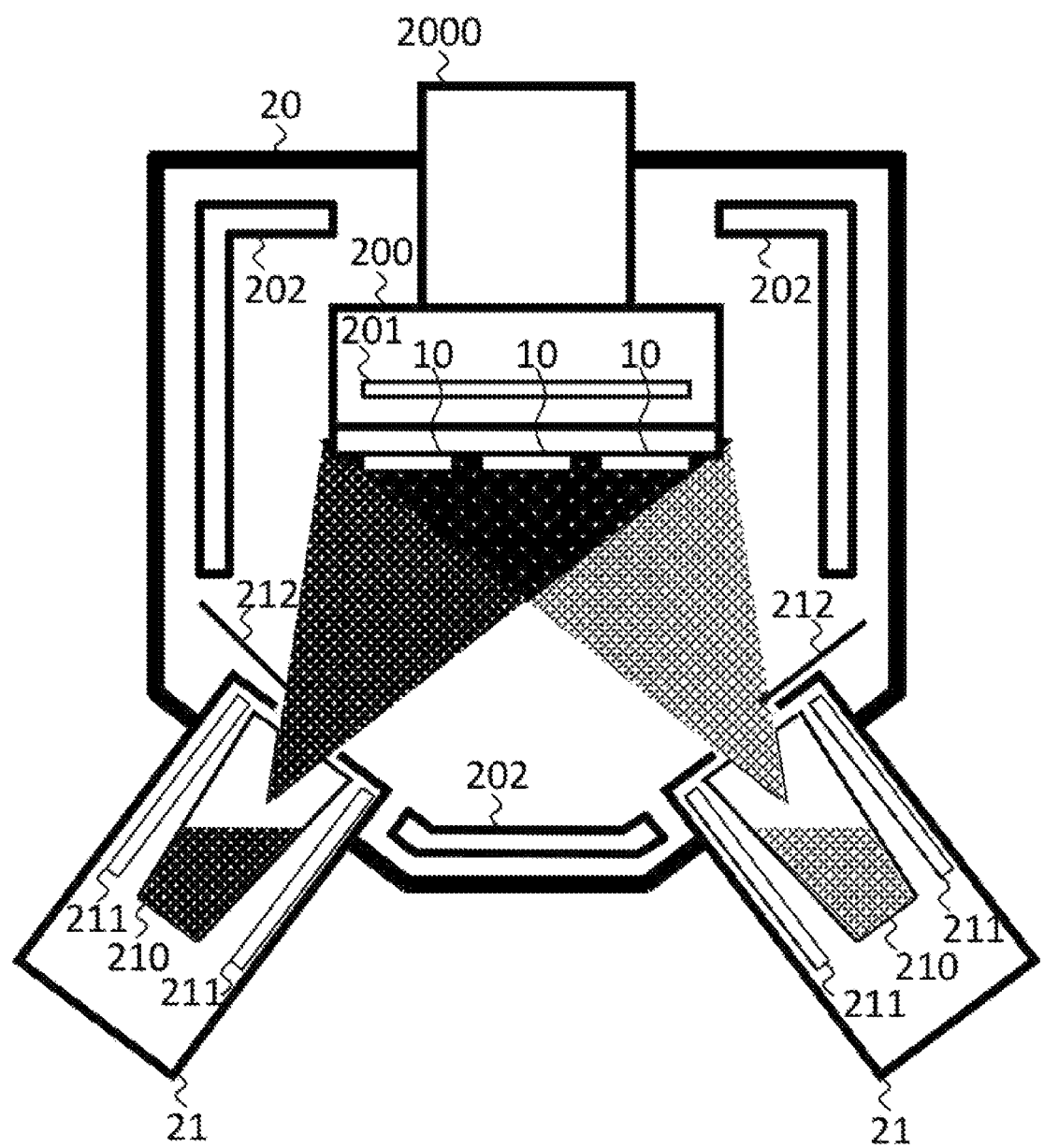
FIG. 3 is a vertical cross-sectional view of the film deposition chamber 20.

FIG. 3 is a vertical cross-sectional view of the film deposition chamber 20. The film deposition chamber 20 includes a substrate manipulator 200 that holds one or more substrates 10, a substrate heater 201 that heats the substrate 10 held by the substrate manipulator 200, a cryopanel 202 that sucks in the gas inside the film deposition chamber 20 by causing liquid nitrogen to flow therein, and the like. The substrate manipulator 200 may be provided to be rotatable centered on a shaft 2000. Furthermore, the film deposition chamber 20 may include a gas supply port for supplying gas (e.g. oxygen, ozone, nitrogen, or ammonia) or the like into the film deposition chamber 20. The film deposition chamber 20 may include a plasma generating mechanism to break down the gas and irradiate the substrate.

One or more cells 21 are provided in the peripheral portion of the film deposition chamber 20. As an example in the present embodiment, each cell 21 is a Knudsen cell, and includes a crucible 210 that holds the raw material, a heater 211 (also referred to as a cell heater 211) that heats the raw material inside the crucible 210, a shutter 212 that opens and closes an opening of the crucible 210 to adjust the flux amount (molecular dose or amount of vapor) of the raw material, and the like. The cell heater 211 in each cell 21 may be divided to be arranged at the top portion and bottom portion of the cell 21.

In the film deposition chamber 20 described above, the film deposition is performed by attaching the substrate 10 to the substrate manipulator 200, reducing the pressure in the film deposition chamber 20 with the vacuum pump 22, heating the substrate 10 with the substrate heater 201, and heating the cells 21 to irradiate the surface of the substrate 10 with the raw material as a molecular beam while rotating the substrate 10.

(2-2. Maintenance of the Film Deposition Apparatus 2)

Various types of maintenance are performed on the film deposition apparatus 2. For example, maintenance may be performed on the film deposition chamber 20, the sub chamber 23, and the loading chamber 24 after opening these chambers to the outside atmosphere, or may be performed while keeping these chambers closed. The maintenance can be performed in a state where the nitrogen has been vented or purged. The maintenance may be performed periodically (e.g. once a year), performed according to the film characteristics of the deposited film, or performed according to the lifetime of the used components, damage to the used components, or the like.

(2-3. Film Deposition Apparatus 2 Control Conditions)

The film deposition apparatus 2 performs the film deposition according to the control condition data. The control condition data may be input conditions that are input to the film deposition apparatus 2, and are input by the operator, for example. The control conditions are not limited to conditions that can be controlled directly by the film deposition apparatus 2, and may be conditions that can be controlled indirectly. As an example, the control condition data may be data concerning at least one of the temperature of each cell 21, the power supplied to the cell heaters 211, the opening/closing condition of the shutter 212, the temperature of the substrate 10, the power supplied to the substrate heater 201, the degree of the vacuum of the film deposition chamber 20, the type of gas present in the film deposition chamber 20, the amount of this gas, the temperature of the cryopanel 202, the amount of liquid nitrogen supplied to the cryopanel 202, the time used for the film deposition, and the gain in the feedback control of the temperature of the cells 21 or the like. Among these, the opening/closing condition of the shutter 212 may be at least one of whether the shutter 212 is in the open state or the closed state, the timing of the opening/closing, and the speed of the opening/closing, for example. The gain in the feedback control may be at least one of the P gain, I gain, and D gain in PID control, for example. If the substrate manipulator 200 is capable of rotating, the rotational speed may be included in the control conditions. The amount of liquid nitrogen supplied to the cryopanel 202 may include the liquid surface (remaining amount) of the liquid nitrogen and the supply flow rate of the liquid nitrogen. The temperature of a thermocouple arranged between the substrate 10 and the substrate heater 201 to control the supply of power to the substrate heater 201, for example, can be used as the temperature of the substrate 10. The control conditions such as described above may be set to change over time, or may be set to be constant regardless of the passage of time. The control conditions may include reference numerals such as recipe numbers or numerals indicating the types of film structures such as laminated structure (1) and laminated structure (2), and setting values for each element included in the control conditions may be collected in a set in association with such reference numerals. The vacuum degree of the film deposition chamber 20 is affected by the temperature of the cryopanel 202 (remaining amount of liquid nitrogen and the like), the operating state of the vacuum pump 22, the temperature of each cell 21, and the like, and therefore is state data indicating the state of the film deposition apparatus 2, but in a case where the film deposition operation is performed when the vacuum degree is better than a certain threshold value, it is possible to use this vacuum degree as a control condition. Similarly, at least some of the pieces of state data described further below indicating the state of the film deposition apparatus 2 may be used as control conditions.

Among the elements of the control conditions described above, the temperatures of the cells 21, the power supplied to the cell heaters 211, and the opening/closing condition of the shutter 212 may be used to indirectly control the flux amount of the raw material. When the flux amount changes, the amount of the raw material reaching the substrate 10 also changes, and therefore the composition and film characteristics (e.g. the film thickness, composition (Mixed crystal ratio and laminated structure), and the like) of the deposited film change. In this case, as a result of controlling the temperatures of the cells 21 as a control condition, for example, the flux amount of the raw material is a measured piece of state data. However, in a case where a correlation is set between the temperatures of the cells 21 and the flux amount of the raw material and it is possible to input the flux amount to the film deposition apparatus 2 to control the flux amount, due to the configuration of the film deposition apparatus 2, the flux amount of the raw material can become a control condition. The temperature of a cell 21 can be the temperature of the thermocouple installed near the crucible attached to the cell 21, in order to control the supply of power to the cell heater 211, for example.

Furthermore, the power supplied to the substrate heater 201 may indirectly control the substrate temperature. When the substrate temperature changes, the ease with which the raw material that has reached the substrate 10 moves also changes, and therefore the degree of crystallization, surface shape, and film characteristics (e.g. surface unevenness, crystallinity, and the like) within the deposited film change.

Yet further, the vacuum degree of the film deposition chamber 20, the type of gas present inside the film deposition chamber 20, the amount of this gas, the temperature of the cryopanel 202, and the flow rate of the liquid nitrogen in the cryopanel 202 may directly or indirectly control the vacuum degree and the quality of the vacuum within the film deposition chamber 20. When the vacuum degree and the vacuum quality change, the amount of impurities mixed into the deposited film also changes. Furthermore, as a result of the straightness of the raw material radiated to the substrate 10 changing, the characteristics of the deposited film change. When the vacuum degree and the vacuum quality change, the amount of impurities mixed into the deposited film changes and the state of the growth surface also changes, and therefore the characteristics of the deposited film change.

(2-4. State of the Film Deposition Apparatus 2)

The state data indicating the state of the film deposition apparatus 2 is used every time the learning processing of the first model 305 and/or the second model 309 is performed. The state data may include data concerning the temperature or humidity of the environment in which the film deposition apparatus 2 is installed, data concerning a RHEED image, the number of times at least one component of the film deposition apparatus 2 has been used, and data relating to a usage history (e.g. what films have been deposited up to this point). Furthermore, the state data may include an actual value of a control target (e.g. actual values in time sequence measured at a plurality of time points or an actual value measured at a certain time point) obtained when the film deposition apparatus 2 operates according to the control conditions indicated by the control condition data. For example, the state data may include data concerning at least one of the flux amount of the raw material irradiating the substrate 10, the temperature of the cells 21, the temperature of the cell heater 211, the power supplied to the cell heater 211, the opening/closing timing of the shutter 212, the opening/closing speed of the shutter 212, the temperature of the substrate 10, the temperature of the substrate heater 201, the power supplied to the substrate heater 201, the vacuum degree of the film deposition chamber 20, the type of gas present inside the film deposition chamber 20, the amount of this gas, the temperature of the cryopanel 202, the amount of liquid nitrogen supplied to the cryopanel 202, the gain in the feedback control of the temperatures of the cells 21, and the rotational velocity of the substrate manipulator 200. Among these, the temperature of each cell 21, the temperature of the cell heater 211, and the temperature of the substrate heater 201 may be measured by a thermocouple. The temperature of the substrate 10 may be measured by a radiation thermometer arranged inside or outside the film deposition chamber 20. Alternatively, the temperature of the substrate 10 may be measured or calculated based on the band-end absorption or transparent spectrum of the substrate 10. The vacuum degree of the film deposition chamber 20 may be measured by an ion gauge arranged inside the film deposition chamber 20. The type and amount of gas present in the film deposition chamber 20 may be measured by a quadrupole mass spectrometer arranged inside the film deposition chamber 20. The state data may include the total film deposition time after maintenance is performed on the film deposition apparatus 2 (elapsed time since the start of the so-called campaign), and characteristics of a base surface (e.g. characteristics of the substrate 10). The film deposition condition acquiring section 303 may acquire the state data concerning the flux amount of the raw material for each cell 21, or may acquire this state data for some of the cells 21. The film deposition condition acquiring section 303 may acquire the state data concerning the substrate temperature for each substrate 10, or may obtain this state data for some of the substrates 10. The film deposition condition acquiring section 303 may acquire the state data concerning the vacuum degree and vacuum quality inside the film deposition chamber 20 as time series data.

Furthermore, the state data may include driving history data indicating the driving history of the film deposition apparatus 2. The driving history data may include at least one of data concerning at least the number of times maintenance has been performed on the film deposition apparatus 2 and the content of the maintenance (e.g. replacement of a certain component, cleaning, and the like), data concerning the amount of raw material charged in the crucible of each cell 21 during maintenance and the number of times the film deposition apparatus 2 has performed film deposition, and data concerning films deposited in the past. The data concerning at least one of the number of times maintenance has been performed and the content of the maintenance may be data indicating the maintenance history. The data concerning the number of times film deposition has been performed may be the number of times film deposition was performed after maintenance, or may be the number of times film deposition was performed totaled independently from the maintenance. The data concerning films formed in the past may be history data indicating the type, characteristics, and the like of films deposited in the past. The pieces of driving history data can be obtained in relation to the raw material attachment state inside the film deposition chamber 20 and the state of the thermal capacitance and thermal conduction of each member.

(3. Operation)

(3-1. Model Learning Processing)

Figure 4:
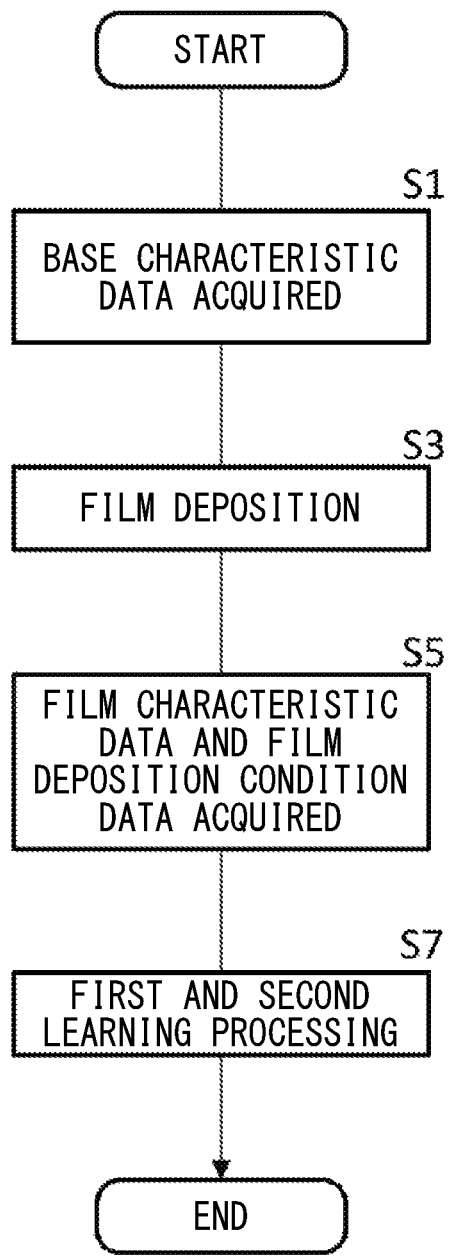
FIG. 4 shows the method of learning the first model 305 and/or the second model 309.

FIG. 4 shows the method of learning the first model 305 and/or the second model 309. The system 1 learns the first model 305 and/or the second model 309 by performing the processes of steps S1 to S7. The system 1 may perform the processes of steps S1 to S7 each time the film deposition operation is performed by the film deposition apparatus 2, or may perform these processes for part of the film deposition operation, such as only a portion of the film deposition operation in a certain time period. The structure of the deposited film may be a single-layer film or a laminated film.

At step S1, the base characteristic acquiring section 301 acquires the base characteristic data indicating the characteristics of the base layer serving as the base on which the film is to be deposited. The base characteristic data may include data concerning at least one of the composition, carrier density, conductivity, temperature dependency of the conductivity, resistivity, temperature dependency of the resistivity, crystallinity, surface unevenness, surface unevenness anisotropy, transmission spectrum, electron mobility, hole mobility, defect density, surface state density, photoluminescence measurement spectrum, electroluminescence measurement spectrum, optical absorption spectrum, electrical characteristic anisotropy, crystal composition anisotropy, surface impurity information, surface contamination information, crystal plane angle, RHEED image, pit information, hillock information, whisker information, image, and in-plane variation for any of these characteristics of the base layer. Instead of or in addition to this, the base characteristic data may include data concerning at least one of the atomic number, atomic mass, atomic electron number, atomic neutron number, atomic electronegativity, atomic electron affinity, atomic ionic radius, atomic covalent radius, atomic van der Waals radius, atomic ionization tendency, atomic ionicity, atomic self-diffusion coefficient, and atomic inter-diffusion coefficient of the atoms contained in the base layer. Instead of or in addition to this, the base characteristic data may include data concerning at least one of the lattice constant, interatomic distance, boiling point, pressure dependency of the boiling point, melting point, pressure dependency of the melting point, cohesive energy, bulk modulus, thermal expansion coefficient, effective electron mass, effective hole mass, specific heat, dielectric constant, nonlinear dielectric constant, band diagram, bandgap, temperature-pressure dependency of the bandgap, spin-orbit interaction, density, Debye temperature, thermal conductivity, thermal diffusion coefficient, Young's modulus, shear modulus, Poisson's ratio, hardness, Knoop hardness, sound velocity, phonon dispersion, state density, optical phonon frequency, acoustic phonon frequency, electron scattering cross-sectional area, phonon scattering cross-sectional area, Gruneisen constant, deformation potential coefficient, piezoelectric constant, electromechanical coupling constant, Fröhlich coupling constant, work function, optical absorption characteristics, Seebeck coefficient, exciton energy, exciton radius, refractive index, temperature-pressure dependency of the refractive index, true carrier density, standard formation enthalpy, standard formation Gibbs energy, radical energy level, state of the surface reconstruction, hole coefficient, hole scattering factor, two-photon absorption coefficient, carrier drift termination velocity, carrier mean free path, minority carrier diffusion length, minority carrier lifetime, and impact ionization parameters of the pure substances and compounds formed by the atoms and base layers. Instead of or in addition to this, the base characteristic data may include data concerning at least one of the Madelung constant of the base layer and the compounds formed by the atoms included in the base layer, the metal bonding radius of the pure substance formed by the atoms contained in the base layer, and the thickness of the base layer.

The composition may be the compositional ratio of the constituent elements or the lattice constant. The crystallinity may be an XRD half-width, and may be information acquired by a curve method, for example. The surface unevenness may be measured by any of an atomic force microscope (AFM), scanning tunneling microscope (STM), scanning electron microscope (SEM), light microscope, and transmission electron microscope (TEM). The defect density may be any of the point defect density, line defect density, and surface defect density. The data concerning the photoluminescence measurement spectrum and electroluminescence measurement spectrum may be data concerning at least one of the intensity and wavelength peak, for example, and is data indicating the maximum intensity value and the maximum wavelength value, for example. The surface impurity information and surface contamination information may be information detected using any of an X-ray fluorescence analysis (XRF), Auger electron spectroscopy (AES), energy dispersive X-ray spectroscopy (SEM-EDX), a wavelength dispersive X-ray analysis (WDX), X-ray photoelectron spectroscopy (XPS), secondary ion mass spectrometry (SIMS), an electron probe microanalysis (EPMA), Fourier transform infrared spectroscopy (FTIR), and a Raman analysis. The crystal plane angle may be the angle according to any of X-ray diffraction (XRD) and electron energy loss spectroscopy (EELS). The information relating to an image of the base layer may be an unaltered image obtained using any of an optical microscope, scanning electron microscope (SEM), and transmission electron microscope (TEM), or may be unevenness data extracted by analyzing an image. The atoms contained in the base layer may include atoms of dopants and semiconductors. The electronegativity may be a value of any of (1) Linus Pauling, (2) Robert Mulliken, (3) A. I. L. Allred & E. G. Rochow, (4) P. I. Villars, (5) J. F. C. Phillips, and (6) J. A. Van Vechten. The ionicity may be a value of any of Phillips, Pauling, and Harrison. The covalent bond radius may be a value of any of (1) Linus Pauling and (2) J. A. Van Vechten & J. C. Phillips. The effective electron mass and the effective hole mass may be the effective mass of the carrier, and may indirectly affect the hardness of the substance. The nonlinear dielectric constant may be a value that defines the amount of electric dipole breaking from the central symmetry of the crystal. The deformation potential coefficient may be a coefficient defined by any of (1) W. H. Kleiner & L. Roth, (2) G. L. Bir & G. e. Pikus, and (3) E. O. Kane. The optical absorption characteristic may be a light absorption spectrum, for example. The standard formation enthalpy and standard formation Gibbs energy may be values concerning the generation of hydrides, oxides, nitrides, sulfides, fluorides, and halides. The state of the surface reconstruction may be a state in which the arrangement of crystal surface atoms is changed depending on the temperature, atmosphere, or growth history, and according to Wood's notation, may be a β2(2×4) structure, γ(2×4) structure, a c(4×4) structure, or the like of the 001 plane of a GaAs crystal. The base characteristic data may be acquired by analytic software. Each characteristic of the base layer may be any of a maximum value, minimum value, average value, or value distribution among a plurality of positions of the base layer, or may be a value at a single position (e.g. the center) of the base layer.

At step S3, the control section 311 supplies the control condition data to the film deposition apparatus 2 to cause the film deposition apparatus 2 to operate, thereby performing film deposition on the base layer. The control condition data may be input by the operator.

At step S5, the film characteristic acquiring section 302 and the film deposition condition acquiring section 303 acquire the film characteristic data of the film that was deposited and the film deposition condition data of the film deposition apparatus 2.

The film characteristic data may include data concerning at least one of the composition, carrier density, conductivity, temperature dependency of the conductivity, resistivity, temperature dependency of the resistivity, crystallinity, surface unevenness, surface unevenness anisotropy, transmission spectrum, reflection spectrum, electron mobility, hole mobility, defect density, surface state density, photoluminescence measurement spectrum, electroluminescence measurement spectrum, optical absorption spectrum, electrical characteristic anisotropy, crystal composition anisotropy, surface impurity information, surface contamination information, crystal plane angle, RHEED image, pit information, hillock information, whisker information, image, and in-plane variation for any of these characteristics of the generated film. At least some of the characteristics indicated by the film characteristic data may be the same as characteristics indicated by the base characteristic data. The film characteristic data may be data indicating actual measured values. Each characteristic of the deposited film may be any of a maximum value, minimum value, average value, or value distribution among a plurality of positions of the deposited film, or may be a value at a single position (e.g. the center) of the deposited film. In a case where film deposition is performed together for a plurality of substrates 10 in a single film deposition operation by the film deposition apparatus 2 (also referred to as a plurality of substrates 10 in the same batch), i.e. in a case where a plurality of substrates 10 are held by the substrate manipulator 200, the film characteristic acquiring section 302 may acquire the film characteristics of all of the substrates 10 among the plurality of substrates 10 in the same batch by inspecting all of the substrates 10, or may acquire these film characteristics by performing an inspection that leaves out the film characteristics of some of the substrates 10. As an example, the film characteristic acquiring section 302 may acquire electrical characteristics, surface states, and the like of the films by inspecting all of the substrates, and may acquire the film thicknesses, crystallinities, and the like by performing an inspection that leaves out some of the substrates.

The film deposition condition data may include at least one of the control condition data and the state data described above. In addition to or instead of this, the film deposition condition data may include theoretical values, literature values, estimated values, and/or the like. For example, the film deposition condition data may include data concerning at least one of the atomic number, atomic mass, atomic electron number, atomic neutron number, atomic electronegativity, atomic electron affinity, atomic ionic radius, atomic covalent radius, atomic van der Waals radius, atomic ionization tendency, atomic ionicity, atomic self-diffusion coefficient, and atomic inter-diffusion coefficient of the atoms contained in the film. Instead of or in addition to this, the film deposition condition data may include data concerning at least one of the lattice constant, interatomic distance (e.g. the shortest interatomic distance), boiling point, pressure dependency of the boiling point, melting point, pressure dependency of the melting point, cohesive energy, bulk modulus, thermal expansion coefficient, effective electron mass, effective hole mass, specific heat, dielectric constant, nonlinear dielectric constant, band diagram, bandgap, temperature-pressure dependency of the bandgap, spin-orbit interaction, density, Debye temperature, thermal conductivity, thermal diffusion coefficient, Young's modulus, shear modulus, Poisson's ratio, hardness, Knoop hardness, sound velocity, phonon dispersion, state density, optical phonon frequency, acoustic phonon frequency, electron scattering cross-sectional area, phonon scattering cross-sectional area, Gruneisen constant, deformation potential coefficient, piezoelectric constant, electromechanical coupling constant, Fröhlich coupling constant, work function, optical absorption characteristics, Seebeck coefficient, exciton energy, exciton radius, refractive index, temperature-pressure dependency of the refractive index, true carrier density, standard formation enthalpy, standard formation Gibbs energy, radical energy level, state of the surface reconstruction, hole coefficient, hole scattering factor, two-photon absorption coefficient, carrier drift termination velocity, carrier mean free path, minority carrier diffusion length, minority carrier lifetime, and impact ionization parameters of the pure substances and compounds formed by the atoms and base layers. Instead of or in addition to this, the film deposition condition data may include data concerning at least one of the Madelung constant of the film and the compounds formed by the atoms included in the film, the metal bonding radius of the pure substance formed by the atoms contained in the film, and the thickness of the film. Here, the atoms contained in the film to be deposited may include atoms of semiconductor and dopants. Each value may be any of a maximum value, minimum value, average value, or value distribution among a plurality of positions of the film, or may be a value at a single position (e.g. the center) of the film.

The processes of steps S1, S3, and S5 do not need to be performed in this order. For example, the process of step S1 may be performed after the process of step S3.

At step S7, the first learning processing section 304 and the second learning processing section 308 perform the learning processing of the first model 305 and the second model 309, using the learning data that includes the acquired film deposition condition data, film characteristic data, and base characteristic data. The initial model of each of the first model 305 and the second model 309 is a random forest, recurrent neural network, or time-delay neural network, but may instead be another machine learning algorithm including gradient boosting, logistic regression, a support vector machine (SVM), and the like. The first model 305 and the second model 309 may include nodes corresponding to each element of the learning data in an input layer, and include nodes corresponding to each element of the control conditions to be recommended in an output layer. There may be one node or a plurality of nodes in the input later for each element of the learning data. An intermediate layer (hidden layer) including one or more nodes may be interposed between the input layer and the output layer. The first learning processing section 304 and the second learning processing section 308 may perform the learning processing by adjusting the weights of the edges connecting the nodes and the bias values of the output nodes.

(3-2. Compound Semiconductor Production)

Figure 5:
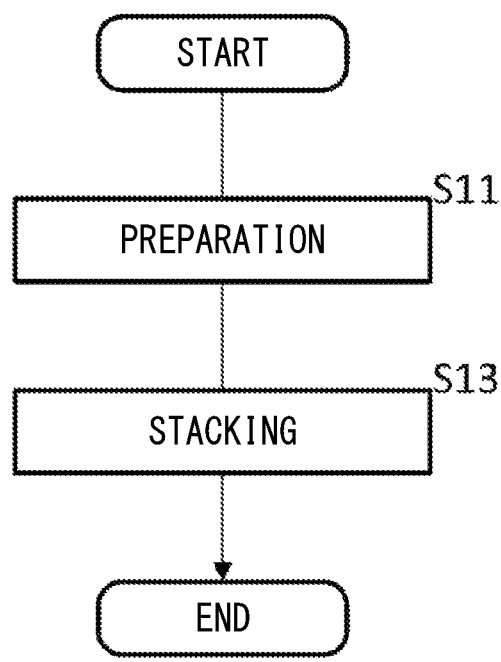
FIG. 5 shows a compound semiconductor production method.

FIG. 5 shows a compound semiconductor production method. First, at step S11, the operator prepares a substrate 10. For example, the operator sets the substrate 10 inside the film deposition chamber 20 of the film deposition apparatus 2. At step S13, the operator stacks a plurality of films to be included in the compound semiconductor onto the substrate 10. In this way, the compound semiconductor in which a plurality of films are stacked on the substrate 10 is produced.

(3-2-1. Film Deposition Using the Model)

Figure 6:
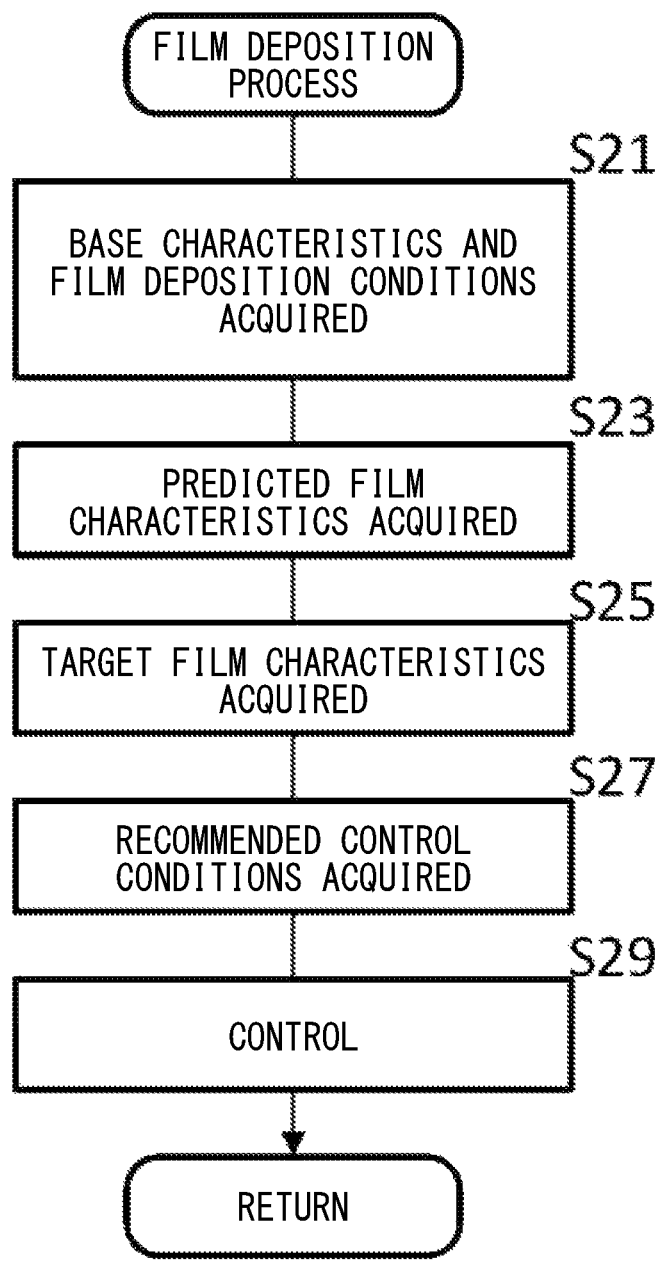
FIG. 6 shows a film deposition method using the first model 305 and the second model 309.

FIG. 6 shows a film deposition method using the first model 305 and the second model 309. The system 1 may deposit at least one film (also referred to as the (n+1)th film, where n is a natural number and indicates the order in which the films are deposited on the substrate 10) among the plurality of stacked films in the process of step S13 described above, using the processes of step S21 to step S29.

At step S21, the base characteristic acquiring section 301 and the film deposition condition acquiring section 303 acquire the base characteristic data indicating the characteristics of the base layer (also referred to as the (n−1)th film) of the nth film and the film deposition condition data at the time the nth film was deposited. At step S23, the film characteristic predicting section 306 acquires the predicted film characteristic data of the nth film corresponding to the film deposition condition data of the nth film and the base characteristic data of the (n−1)th film, using the first model 305.

The predicted film characteristic data may include data concerning at least one of the composition, carrier density, conductivity, temperature dependency of the conductivity, resistivity, temperature dependency of the resistivity, crystallinity, surface unevenness, surface unevenness anisotropy, transmission spectrum, electron mobility, hole mobility, defect density, surface state density, photoluminescence measurement spectrum, electroluminescence measurement spectrum, optical absorption spectrum, electrical characteristic anisotropy, crystal composition anisotropy, surface impurity information, surface contamination information, crystal plane angle, RHEED image, pit information, hillock information, whisker information, image, and in-plane variation for any of these characteristics of the film to be generated. At least some of the characteristics indicated by the predicted film characteristic data may be the same as characteristics indicated by the film characteristic data. At least some of the characteristics indicated by the predicted film characteristic data may be the same as characteristics indicated by the base characteristic data.

At step S25, the target film characteristic acquiring section 307 acquires the target film characteristic data of the (n+1)th film. The target film characteristic data may include data concerning at least one of the composition, carrier density, conductivity, temperature dependency of the conductivity, resistivity, temperature dependency of the resistivity, crystallinity, surface unevenness, surface unevenness anisotropy, transmission spectrum, electron mobility, hole mobility, defect density, surface state density, photoluminescence measurement spectrum, electroluminescence measurement spectrum, optical absorption spectrum, electrical characteristic anisotropy, crystal composition anisotropy, surface impurity information, surface contamination information, crystal plane angle, RHEED image, pit information, hillock information, whisker information, image, and in-plane variation for any of these characteristics of the film to be generated. At least some of the characteristics indicated by the target film characteristic data may be the same as characteristics indicated by the film characteristic data and/or the predicted film characteristic data. At least some of the characteristics indicated by the target film characteristic data may be the same as characteristics indicated by the base characteristic data. The target film characteristic data may include numerical range data concerning at least some of the characteristics.

At step S27, the recommended control condition output section 310 acquires the recommended control condition data for depositing the (n+1)th film, corresponding to the predicted film characteristic data of the nth film serving as the targeted base characteristic data and the target film characteristic data of the (n+1)th layer, using the second model 309. If the target film characteristic data includes numerical range data for some of the characteristics, the recommended control condition data may indicate the control conditions for depositing the film in which each characteristic satisfies the corresponding numerical range. The recommended control condition data may include numerical range data concerning at least some of the control conditions. The recommended control condition output section 310 may use the base characteristic data acquired by the base characteristic acquiring section 301 for the nth film serving as the base layer of the (n+1)th film, instead of using the predicted film characteristic data of the nth film acquired by the processes of steps S21 to S23, as the targeted base characteristic data. At step S29, the control section 311 causes the film deposition apparatus 2 to operate according to the control conditions indicated by the recommended control condition data, to deposit the (n+1)th film.

Similarly, if the processes of steps S21 to S29 are performed again to deposit the (n+2)th film, at step S21, instead of the base characteristic acquiring section 301 acquiring the base characteristic data indicating the characteristics of the nth film serving as the base layer for the (n+1)th film, the film characteristic predicting section 306 may acquire the predicted film characteristic data of the nth film that was acquired in the previous instance of step S23, as the base characteristic data. In this way, every time film deposition is performed, it is possible to eliminate the work of acquiring the characteristics of the generated film from the operator or measurement device. Furthermore, at step S23, the film characteristic predicting section 306 may acquire the predicted film characteristic data of the (n+1)th film using the first model 305, or the recommended control condition output section 310 may acquire the target film characteristic data of the (n+1)th film acquired at the previous instance of step S25, as the predicted film characteristic data of the (n+1)th film.

When film deposition is performed in the manner described above, the learning processing of FIG. 4 described above may further be performed by inputting the film deposition condition data, the film characteristic data, and the base characteristic data at the time of each film deposition to the first model 305 and/or the second model 309, as the learning data. In this case, it is possible to proceed with the learning processing of the first model 305 and/or the second model 309 while producing the compound semiconductors.

(4. Specific Example of Compound Semiconductor)

The compound semiconductor to be produced may be used in a sensor such as a magnetic sensor or an infrared sensor (e.g. an infrared gas sensor), for example. In this case, the base layer and the deposited film may be at least a portion of the infrared sensor or the magnetic sensor. The compound semiconductor may be used for another purpose, such as a light emitting element of an LED.

Figure 7:
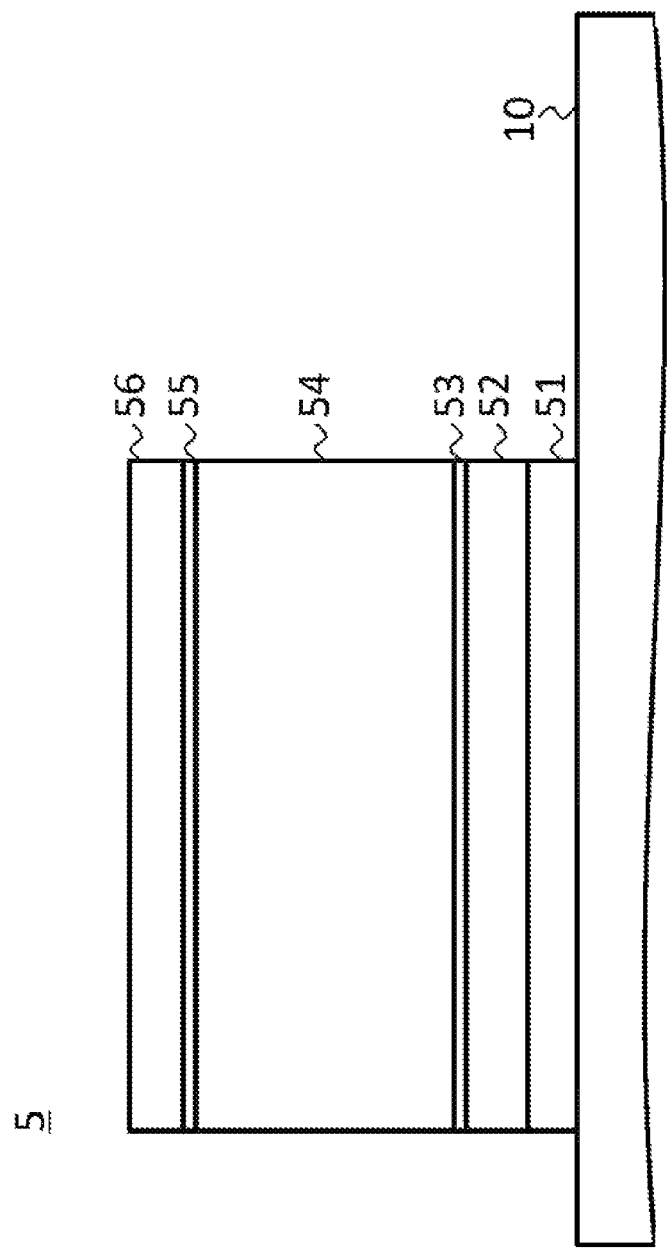
FIG. 7 shows a layered configuration of an infrared sensor 5.

FIG. 7 shows a layered configuration of an infrared sensor 5. As an example, the infrared sensor 5 includes, on a gallium arsenide substrate 10, an $n^+$ layer 51 of indium antimonide (InSb), an $n^+$ layer 52 of aluminum indium antimonide (AlInSb), an $n^+$ layer (barrier layer) 53 of aluminum indium antimonide (AlInSb), an active layer 54 of aluminum indium antimonide (AlInSb), a $p^+$ layer (barrier layer) 55 of aluminum indium antimonide (AlInSb), and a $p^+$ layer 56 of indium antimonide (InSb). The film deposited according to the film deposition method of FIG. 6 may be any of the layers 51 to 56. The infrared sensor 5 may further include a silicon dioxide ($SiO_2$) layer, a silicon nitride ($Si_3N_4$) layer, and/or an electrode layer.

(5. Modifications)

In the embodiment described above, the learning processor 3 includes the film deposition condition acquiring section 303, the first model 305, the film characteristic predicting section 306, the target film characteristic acquiring section 307, the second model 309, and the control section 311, but at least one of these components may be omitted. If the film deposition condition acquiring section 303 is not included, the learning processor 3 may perform the learning processing using the film characteristic data and the base characteristic data, and acquire the predicted film characteristic data using the base characteristic data as input to the first model 305. In this way, if the characteristics of the film to be deposited do not depend of the film deposition conditions, for example, the learning processing of the first model 305 and/or the second model 309 can be performed and the predicted film characteristic data can be acquired from the first model 305. If the learning processor 3 does not include the first model 305 and/or the second model 309, the first model 305 and/or the second model 309 may be stored in a server outside the learning processor 3.

Furthermore, the second model 309 is described as outputting the recommended control condition data based on the targeted base characteristic data and the target film characteristic data, but may instead output recommended film deposition condition data that includes the state data (e.g. the film characteristics of the base layer) recommended for depositing the film with the target characteristics and the recommended control condition data based on the target film characteristic data. In this way, the recommended control condition data for depositing an Nth film (where N is a natural number indicating the order of deposition on the substrate 10) from the target film characteristic data of the Nth film and the film characteristic data recommended for the (N−1)th film serving as the base layer are output. Furthermore, by using the film characteristic data recommended for this (N−1)th film as the target film characteristic data, the recommended control condition data for depositing the (n−1)th film and the film characteristic data recommended for the (N−2)th film serving as the base layer are output. After this, by repeating a similar process, it is possible to obtain the recommended control condition data for each layer from the first film to the Nth film on the substrate 10 and the film characteristic data recommended for each base layer from the surface of the substrate 10 to the (N−1)th layer. The recommended control condition data obtained from the target film characteristic data may include numerical range data concerning at least some of the control conditions.

The film deposition condition data is described as including the control condition data and the state data of the film deposition apparatus 2, but may include other data instead of or in addition to this. For example, the film deposition condition data may include identification data of the operator of the film deposition apparatus 2. In this case, if there are differences in the characteristics of films to be deposited due to the operator, is it possible for the first model 305 and/or the second model 309 to learn these differences.

Various embodiments of the present invention may be described with reference to flowcharts and block diagrams whose blocks may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), and the like.

The computer-readable medium may be a tangible device that can store instructions to be executed by a suitable device, and as a result, a computer-readable medium having instructions stored thereon is a product that includes instructions that can be executed in order to create the means for executing the operations designated by flow charts and block diagrams. Examples of the computer-readable medium may include an electronic storage device, a magnetic storage device, an optical storage device, an electromagnetic recording medium, a magnetic recording medium, an optical recording medium, an electromagnetic recording medium, a semiconductor recording medium, and the like. Specific examples of the computer-readable medium may include a floppy (Registered Trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a portable compact disc read-only memory (CD-ROM), a digital versatile disk (DVD), a Blu-ray (Registered Trademark) disk, a memory stick, an integrated circuit card, or the like.

The computer-readable instructions may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA (Registered Trademark), C++ or the like, and conventional procedural programming languages, such as the "C" programming language or similar programming languages.

The computer-readable instructions may be provided to a processor or programmable circuitry of a general purpose computer, special purpose computer, or other programmable data processing apparatus to produce a machine, either locally, via a local area network (LAN), or via a wide area network (WAN) such as the Internet, and may be executed to create the means for performing the operations designated by the flow charts and block diagrams. Examples of the processor include a computer processor, a processing unit, a microprocessor, a digital signal processor, a controller, a microcontroller, and the like.

Figure 8:
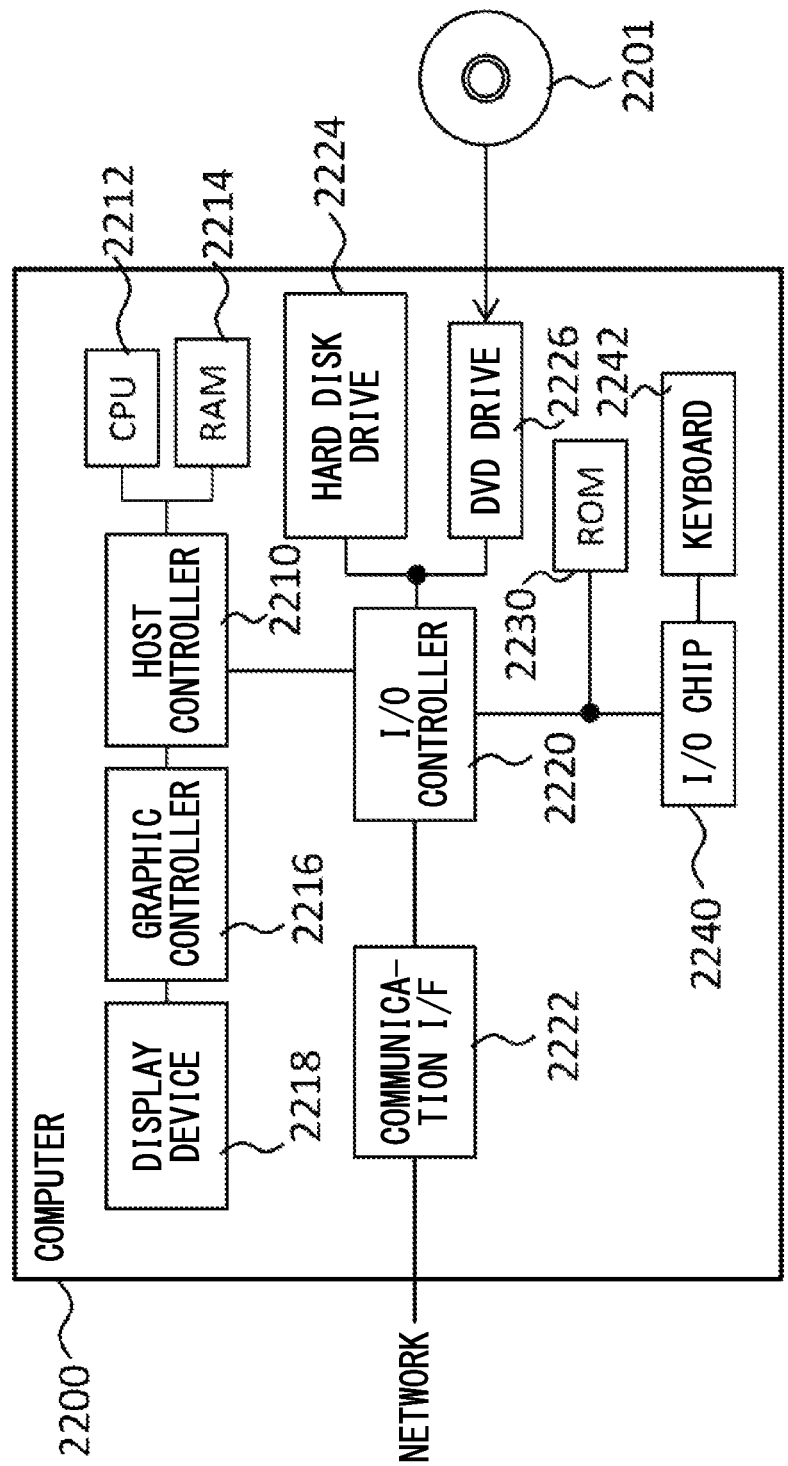
FIG. 8 shows an example of a computer 2200 in which aspects of the present invention may be wholly or partly embodied.

FIG. 8 shows an example of a computer 2200 in which aspects of the present invention may be wholly or partly embodied. A program that is installed in the computer 2200 can cause the computer 2200 to function as or perform operations associated with apparatuses of the embodiments of the present invention or one or more sections thereof, and/or cause the computer 2200 to perform processes of the embodiments of the present invention or steps thereof. Such a program may be executed by the CPU 2212 to cause the computer 2200 to perform certain operations associated with some or all of the blocks of flowcharts and block diagrams described herein.

The computer 2200 according to the present embodiment includes a CPU 2212, a RAM 2214, a graphic controller 2216, and a display device 2218, which are mutually connected by a host controller 2210. The computer 2200 also includes input/output units such as a communication interface 2222, a hard disk drive 2224, a DVD-ROM drive 2226 and an IC card drive, which are connected to the host controller 2210 via an input/output controller 2220. The computer also includes legacy input/output units such as a ROM 2230 and a keyboard 2242, which are connected to the input/output controller 2220 through an input/output chip 2240.

The CPU 2212 operates according to programs stored in the ROM 2230 and the RAM 2214, thereby controlling each unit. The graphic controller 2216 obtains image data generated by the CPU 2212 on a frame buffer or the like provided in the RAM 2214 or in itself, and causes the image data to be displayed on the display device 2218.

The communication interface 2222 communicates with other electronic devices via a network. The hard disk drive 2224 stores programs and data used by the CPU 2212 within the computer 2200. The DVD-ROM drive 2226 reads the programs or the data from the DVD-ROM 2201, and provides the hard disk drive 2224 with the programs or the data via the RAM 2214. The IC card drive reads programs and data from an IC card, and/or writes programs and data into the IC card.

The ROM 2230 stores therein a boot program or the like executed by the computer 2200 at the time of activation, and/or a program depending on the hardware of the computer 2200. The input/output chip 2240 may also connect various input/output units via a parallel port, a serial port, a keyboard port, a mouse port, and the like to the input/output controller 2220.

A program is provided by computer readable media such as the DVD-ROM 2201 or the IC card. The program is read from the computer readable media, installed into the hard disk drive 2224, RAM 2214, or ROM 2230, which are also examples of computer readable media, and executed by the CPU 2212. The information processing described in these programs is read into the computer 2200, resulting in cooperation between a program and the above-mentioned various types of hardware resources. An apparatus or method may be constituted by realizing the operation or processing of information in accordance with the usage of the computer 2200.

For example, when communication is performed between the computer 2200 and an external device, the CPU 2212 may execute a communication program loaded onto the RAM 2214 to instruct communication processing to the communication interface 2222, based on the processing described in the communication program. The communication interface 2222, under control of the CPU 2212, reads transmission data stored on a transmission buffering region provided in a recording medium such as the RAM 2214, the hard disk drive 2224, the DVD-ROM 2201, or the IC card, and transmits the read transmission data to a network or writes reception data received from a network to a reception buffering region or the like provided on the recording medium.

In addition, the CPU 2212 may cause all or a necessary portion of a file or a database to be read into the RAM 2214, the file or the database having been stored in an external recording medium such as the hard disk drive 2224, the DVD-ROM drive 2226 (DVD-ROM 2201), the IC card, etc., and perform various types of processing on the data on the RAM 2214. The CPU 2212 may then write back the processed data to the external recording medium.

Various types of information, such as various types of programs, data, tables, and databases, may be stored in the recording medium to undergo information processing. The CPU 2212 may perform various types of processing on the data read from the RAM 2214, which includes various types of operations, processing of information, condition judging, conditional branch, unconditional branch, search/replace of information, etc., as described throughout this disclosure and designated by an instruction sequence of programs, and writes the result back to the RAM 2214. In addition, the CPU 2212 may search for information in a file, a database, etc., in the recording medium. For example, when a plurality of entries, each having an attribute value of a first attribute associated with an attribute value of a second attribute, are stored in the recording medium, the CPU 2212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer readable media on or near the computer 2200. In addition, a recording medium such as a hard disk or a RAM provided in a server system connected to a dedicated communication network or the Internet can be used as the computer readable media, thereby providing the program to the computer 2200 via the network.

While the embodiments of the present invention have been described, the technical scope of the invention is not limited to the above described embodiments. It will be apparent to persons skilled in the art that various alterations and improvements can be added to the above-described embodiments. It should also apparent from the scope of the claims that the embodiments added with such alterations or improvements are within the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

LIST OF REFERENCE NUMERALS

1: system, 2: film deposition apparatus, 3: learning processor, 5: infrared sensor, 10: substrate, 20: film deposition chamber, 21: cell, 22: vacuum pump, 23: sub chamber, 24: loading chamber, 200: substrate manipulator, 201: substrate heater, 202: cryopanel, 210: crucible, 211: heater, 212: shutter, 301: base characteristic acquiring section, 302: film characteristic acquiring section, 303: film deposition condition acquiring section, 304: first learning processing section, 305: first model, 306: film characteristic predicting section, 307: target film characteristic acquiring section, 308: second learning processing section, 309: second model, 310: recommended control condition output section, 311: control section, 2000: shaft, 2200: computer, 2201: DVD-ROM, 2210: host controller, 2212: CPU, 2214: RAM, 2216: graphic controller, 2218: display device, 2220: input/output controller, 2222: communication interface, 2224: hard disk drive, 2226: DVD-ROM drive, 2230: ROM, 2240: input/output chip, 2242: keyboard

What is claimed is:

1. A learning processor comprising:
a base characteristic acquiring section that acquires base characteristic data indicating a characteristic of a base layer serving as a base on which a film is to be deposited by a film deposition apparatus, including a first base characteristic data indicating a characteristic of a first base layer;
a film characteristic acquiring section that acquires film characteristic data indicating a characteristic of the film deposited on the base layer by the film deposition apparatus;
a first learning processing section that performs learning processing of a first model that outputs predicted film characteristic data obtained by predicting a characteristic of a film to be deposited by the film deposition apparatus based on targeted base characteristic data or targeted film characteristic data indicating a characteristic of a target for formation of the film, using learning data that includes the base characteristic data and the film characteristic data; and
a film characteristic predicting section that uses the first model to output:
first predicted film characteristic data obtained by predicting a characteristic of the first film to be deposited on the first base layer, based on input of the first base characteristic data indicating a characteristic of the first base layer, and
second predicted film characteristic data obtained by predicting a characteristic of the second film to be deposited onto the first film based on input of the first predicted film characteristic data indicating the characteristic of the first film serving as a target for formation of the second film.

2. The learning processor according to claim 1, further comprising:
a film deposition condition acquiring section that acquires film deposition condition data indicating a film deposition condition used by the film deposition apparatus to deposit the film on the base layer, wherein
the first learning processing section performs learning processing of the first model that outputs the predicted film characteristic data based on the targeted base characteristic data and the film deposition condition data, using the learning data that further includes the film deposition condition data.

3. The learning processor according to claim 2, wherein the film deposition condition data includes at least one of control condition data indicating a control condition used to control the film deposition apparatus when deposition of the film on the base layer was performed and state data indicating a state of the film deposition apparatus.

4. The learning processor according to claim 3, wherein the film deposition apparatus is a molecular beam epitaxy apparatus, and
the film deposition condition data includes data concerning at least one of a flux amount of raw material to be radiated to a substrate, a temperature of a cell of the molecular beam epitaxy apparatus, power supplied to a heater of the cell, an opening/closing condition of a shutter of the cell, a temperature of a substrate, power supplied to a substrate heater, vacuum degree of a chamber, type of gas present inside the chamber, an amount of the gas, a temperature of a cryopanel inside the chamber, an amount of liquid nitrogen supplied to the cryopanel, time needed for film deposition, gain in feedback control of the temperature of the cell, the number of times an apparatus component has been used, a usage history of the apparatus component, and a RHEED image.

5. The learning processor according to claim 2, wherein the film deposition condition data is data including at least one of an atomic number, atomic mass, atomic electron number, atomic neutron number, atomic electronegativity, atomic electron affinity, atomic ionic radius, atomic covalent radius, atomic van der Waals radius, atomic ionization tendency, atomic ionicity, atomic self-diffusion coefficient, and atomic inter-diffusion coefficient of atoms contained in the deposited film; a lattice constant, interatomic distance, boiling point, pressure dependency of the boiling point, melting point, pressure dependency of the melting point, cohesive energy, bulk modulus, thermal expansion coefficient, effective electron mass, effective hole mass, specific heat, dielectric constant, nonlinear dielectric constant, band diagram, bandgap, temperature-pressure dependency of the bandgap, spin-orbit interaction, density, Debye temperature, thermal conductivity, thermal diffusion coefficient, Young's modulus, shear modulus, Poisson's ratio, hardness, Knoop hardness, sound velocity, phonon dispersion, state density, optical phonon frequency, acoustic phonon frequency, electron scattering cross-sectional area, phonon scattering cross-sectional area, Gruneisen constant, deformation potential coefficient, piezoelectric constant, electromechanical coupling constant, Frhlich coupling constant, work function, optical absorption characteristics, Seebeck coefficient, exciton energy, exciton radius, refractive index, temperature-pressure dependency of the refractive index, true carrier density, standard formation enthalpy, standard formation Gibbs energy, radical energy level, state of surface reconstruction, hole coefficient, hole scattering factor, two-photon absorption coefficient, carrier drift termination velocity, carrier mean free path, minority carrier diffusion length, minority carrier lifetime, and impact ionization parameter of a pure substance and a compound formed by the atoms and the film; and a Madelung constant of the film and the compound, metal bonding radius of the pure substance, and film thickness.

6. The learning processor according to claim 1, wherein the film characteristic data and the predicted film characteristic data each include data concerning at least one of a composition, carrier density, conductivity, temperature dependency of the conductivity, resistivity, temperature dependency of the resistivity, crystallinity, surface unevenness, surface unevenness anisotropy, transmission spectrum, electron mobility, hole mobility, defect density, surface state density, photoluminescence measurement spectrum, electroluminescence measurement spectrum, optical absorption spectrum, electrical characteristic anisotropy, crystal composition anisotropy, surface impurity information, surface contamination information, crystal plane angle, RHEED image, pit information, hillock information, whisker information, image, and in-plane variation for any of these characteristics of the film.

7. The learning processor according to claim 1, wherein the base characteristic data includes data concerning at least one of a composition, carrier density, conductivity, temperature dependency of the conductivity, resistivity, temperature dependency of the resistivity, crystallinity, surface unevenness, surface unevenness anisotropy, transmission spectrum, electron mobility, hole mobility, defect density, surface state density, photoluminescence measurement spectrum, electroluminescence measurement spectrum, optical absorption spectrum, electrical characteristic anisotropy, crystal composition anisotropy, surface impurity information, surface contamination information, crystal plane angle, RHEED image, pit information, hillock information, whisker information, image, and in-plane variation for any of these characteristics of the base layer; an atomic number, atomic mass, atomic electron number, atomic neutron number, atomic electronegativity, atomic electron affinity, atomic ionic radius, atomic covalent radius, atomic van der Waals radius, atomic ionization tendency, atomic ionicity, atomic self-diffusion coefficient, and atomic inter-diffusion coefficient of atoms contained in the base layer; a lattice constant, interatomic distance, boiling point, pressure dependency of the boiling point, melting point, pressure dependency of the melting point, cohesive energy, bulk modulus, thermal expansion coefficient, effective electron mass, effective hole mass, specific heat, dielectric constant, nonlinear dielectric constant, band diagram, bandgap, temperature-pressure dependency of the bandgap, spin-orbit interaction, density, Debye temperature, thermal conductivity, thermal diffusion coefficient, Young's modulus, shear modulus, Poisson's ratio, hardness, Knoop hardness, sound velocity, phonon dispersion, state density, optical phonon frequency, acoustic phonon frequency, electron scattering cross-sectional area, phonon scattering cross-sectional area, Gruneisen constant, deformation potential coefficient, piezoelectric constant, electromechanical coupling constant, Frhlich coupling constant, work function, optical absorption characteristics, Seebeck coefficient, exciton energy, exciton radius, refractive index, temperature-pressure dependency of the refractive index, true carrier density, standard formation enthalpy, standard formation Gibbs energy, radical energy level, state of surface reconstruction, hole coefficient, hole scattering factor, two-photon absorption coefficient, carrier drift termination velocity, carrier mean free path, minority carrier diffusion length, minority carrier lifetime, and impact ionization parameter of a pure substance and a compound formed by the atoms and the base layer; and a Madelung constant of the base layer and the compound, metal bonding radius of the pure substance, and film thickness of the base layer.

8. The learning processor according to claim 1, wherein the base layer and the film deposited on the base layer include crystal structures belonging to any of a diamond type structure, a sphalerite type structure, and a wurtzite type structure.

9. The learning processor according to claim 3, further comprising:
a second learning processing section that performs learning processing of a second model that outputs recommended control condition data indicating the control condition recommended for depositing a film having a target characteristic based on the targeted base characteristic data and target film characteristic data indicating the target characteristic of the film or on the target film characteristic data, using learning data that includes the base characteristic data, the film characteristic data, and the film deposition condition data.

10. The learning processor according to claim 9, further comprising:
   a film characteristic predicting section that outputs first predicted film characteristic data obtained by predicting a characteristic of a first film to be deposited on a first base layer based on first base characteristic data indicating a characteristic of the first base layer, using the first model; and
   a recommended control condition output section that outputs first recommended control condition data indicating the control condition recommended for depositing a second film based on the first predicted film characteristic data and first target film characteristic data indicating a target characteristic of the second film to be deposited on the first film, using the second model.

11. The learning processor according to claim 1, wherein a random forest, recurrent neural network, or time-delay neural network is used as an initial model for generating the first model.

12. The learning processor according to claim 1, wherein the base layer and the film to be deposited are at least a portion of an infrared sensor or a magnetic sensor.

13. The learning processor according to claim 1, wherein the film to be deposited includes at least one of Al, Ga, In, As, Sb, Si, Te, Sn, Zn, and Be.

14. A learning processing method comprising:
   acquiring base characteristic data indicating a characteristic of a base layer serving as a base on which a film is to be deposited by a film deposition apparatus, including a first base characteristic data indicating a characteristic of a first base layer;
   acquiring film characteristic data indicating a characteristic of the film deposited on the base layer by the film deposition apparatus;
      performing learning processing of a first model that outputs predicted film characteristic data obtained by predicting a characteristic of a film to be deposited by the film deposition apparatus based on targeted base characteristic data or targeted film characteristic data indicating a characteristic of a target for formation of the film, using learning data that includes the base characteristic data and the film characteristic data; and
   a film characteristic predicting section that uses the first model to output:
      first predicted film characteristic data obtained by predicting a characteristic of the first film to be deposited on the first base layer, based on input of the first base characteristic data indicating a characteristic of the first base layer, and
      second predicted film characteristic data obtained by predicting a characteristic of the second film to be deposited onto the first film based on input of the first predicted film characteristic data indicating the characteristic of the first film serving as a target for formation of the second film.

15. The learning processing method according to claim 14, further comprising:
   acquiring film deposition condition data indicating a film deposition condition when the film was deposited by the film deposition apparatus on the base layer, the film deposition condition data including at least one of control condition data indicating a control condition used to control the film deposition apparatus when the film was deposited on the base layer and state data indicating a state of the film deposition apparatus; and
   performing learning processing of a second model that outputs recommended control condition data indicating the control condition recommended for depositing a film having a target characteristic based on the targeted base characteristic data and target film characteristic data indicating the target characteristic of the film, using learning data that includes the base characteristic data, the film characteristic data, and the film deposition condition data, wherein
   the performing learning processing of the first model includes performing learning processing of the first model that outputs the predicted film characteristic data based on the targeted base characteristic data and the film deposition condition data, using the learning data that further includes the film deposition condition data.

16. A compound semiconductor production method comprising:
   preparing a substrate; and
   stacking a plurality of films to be included in a compound semiconductor on the substrate, wherein
   the stacking includes causing the film deposition apparatus to operate using the recommended control condition data obtained through the learning processing method according to claim 15, to deposit at least one film among the plurality of films.

17. A non-transitory recording medium storing thereon a program that causes a computer to function as:
   a base characteristic acquiring section that acquires base characteristic data indicating a characteristic of a base layer serving as a base on which a film is to be deposited by a film deposition apparatus, including a first base characteristic data indicating a characteristic of a first base layer;
   a film characteristic acquiring section that acquires film characteristic data indicating a characteristic of the film deposited on the base layer by the film deposition apparatus;
   a first learning processing section that performs learning processing of a first model that outputs predicted film characteristic data obtained by predicting a characteristic of a film to be deposited by the film deposition apparatus based on targeted base characteristic data or targeted film characteristic data indicating a characteristic of a target for formation of the film, using learning data that includes the base characteristic data and the film characteristic data; and
   a film characteristic predicting section that uses the first model to output:
      first predicted film characteristic data obtained by predicting a characteristic of the first film to be deposited on the first base layer, based on input of the first base characteristic data indicating a characteristic of the first base layer, and
      second predicted film characteristic data obtained by predicting a characteristic of the second film to be deposited onto the first film based on input of the first predicted film characteristic data indicating the characteristic of the first film serving as a target for formation of the second film.

* * * * *